3,114,640
COMPOSITION FOR RIPENING FRUITS AND PROCESS OF USING THE SAME

Emanuel Vanzo, Jr., Clifton, N.J., assignor to The Matheson Company, Inc., East Rutherford, N.J., a corporation of New Jersey
No Drawing. Filed May 12, 1961, Ser. No. 109,502
8 Claims. (Cl. 99—103)

This invention relates to a method of and composition for accelerating ripening of fruit.

Many types of fruit have characteristics that make it advantageous to pick them and ship them before they are ripe. For example, bananas are grown in the Tropics, but consumed in other climates. Beside the fact that, if picked ripe, they would be over-ripe on arrival at their destination, bananas endure shipping better when they are green and therefore arrive in better condition if picked and shipped before they are ripe.

Ripening of fruit that is picked green is effected by permitting it to stand, which is a long process with an unpredictable ripening schedule. This problem has been relieved by treating fruit with certain gases that accelerate ripening. For example, treatment of bananas with olefinic hydrocarbon gases such as ethylene and propylene will cause them to ripen on a predictable schedule in a few days. Ripening fruit by treatment with such gas does not in any way affect the flavor, nutritional value, or appearance of the fruit.

When ripening fruit in this manner many serious accidents have occurred because olefinic hydrocarbon gas is flammable and explosive. Even when the amount of gas introduced into an enclosure used for ripening fruit is measured to be less than the amount required to produce an explosive mixture, serious accidents have occurred for various reasons. The people working in ripening plants are usually not skilled chemists and they do not understand the nature of the flammable gas or the concept of limiting the concentration to avoid explosive mixtures. They may use too much gas thereby producing an explosive mixture, or, more commonly, they fail to realize that although there may be no explosion hazard at equilibrium conditions, serious explosion hazards can exist locally while the tank that contains the ripening gas is being discharged. Therefore, a person who is smoking, or a sparking motor in the vicinity of a discharging tank can cause an explosion even though there is insufficient olefinic gas in the tank to burn when it is homogeneously mixed with the air in the room. Another danger is that fractured tanks or leaking valves may create an explosive mixture in a storage space that is not intended for use in ripening fruit.

It is an object of this invention to provide a ripening gas that is non-flammable and non-explosive. It is another object of this invention to provide such a gas that is safe under any and all conditions of use and storage.

It is another object of this invention to provide a method of ripening fruit that is free from fire and explosion hazards but which will rapidly effect ripening of fruit on a predictable schedule.

The compositions of this invention comprise an olefinic hydrocarbon gas having less than 5 carbon atoms, that is ethylene, propylene or butylene, mixed with a non-flammable, volatile compound of fluorine and carbon having less than 5 carbon atoms and preferably more than one fluorine atom. The fluorine-carbon compounds of this invention are preferably derivatives of methane and ethane and may contain hydrogen atoms and chlorine atoms as well as fluorine atoms. The compositions of this invention preferably comprise at least 57 mol percent of the fluorine compound. In this mol ratio the compositions will neither burn nor explode in any proportion in air and they are completely safe whether in equilibrium mixture or in temporary local concentrations and whether in use for ripening fruit or in storage. Greater concentrations of fluorine compound may be employed, for example 75 mol percent, but such greater dilution of the olefin results in a less satisfactory ripening mixture.

A preferred composition embodying this invention comprises propylene and monochlorodifluoromethane. These components are approximately of equal volatility and even if applied in the liquid phase they will evaporate at approximately the same rate and will avoid the temporary formation of a vapor enriched in propylene that could be flammable. Another preferred composition embodying this invention comprises propylene and dichlorodifluoromethane. Other fluorine compounds that may be used include, but are not limited to, trichlorofluoromethane; 1,2-dichloro-1,1,2,2-tetrafluoroethane; octafluorocyclobutane; trifluorochloromethane, trifluoromethane, tetrafluoromethane, pentafluoroethane, pentafluorochloroethane, hexafluoroethane, and mixtures of these.

The method of this invention comprises the use of the compositions hereinabove described in a manner to eliminate formation of a hazardous mixture. The method includes placing fruit to be ripened in an enclosure and then introducing into the enclosure a mixed stream of ethylene, propylene, butylene, or mixtures of these as a ripening component, and a non-flammable fluorine-carbon compound such as one of those named above as a modifying component. The mixed stream contains at least 57 mol percent of the modifying component.

A preferred embodiment of this process includes employing an olefin and a fluorine compound that have similar boiling points to avoid fractional evaporation prior to the establishment of equilibrium. When employing the preferred embodiment of this process, the mixed stream of ripening component and modifying component may be introduced in vapor phase or in liquid phase by any means that is convenient.

Another embodiment of this invention includes preheating the mixed stream during its introduction into a ripening chamber to a temperature that insures that it is discharged as a mixed gas stream without any liquid phase thereby providing a composition that will not be flammable or explosive before equilibrium mixture with air is obtained.

Following is an example of a preferred embodiment of this invention.

Green bananas which, as received from the grower on the stalk, are normally ripened by storage in a warm place, are placed on racks so that all are exposed to the atmosphere in an enclosed room having a volume of approximately 1,000 cubic feet. The door to the room is closed and sealed, and through fittings in the wall of the room 1.2 pounds of a mixture of 43 mol percent propylene and 57 mol percent monochlorodifluoromethane are introduced. The room is maintained at a temperature of approximately 65–70 degrees Fahrenheit. After a period of from about 40 to about 70 hours depending on the original condition of the bananas, the room is opened and the bananas in fully ripened condition are ready for cutting the hands from the stalk. The bananas that result from this treatment have excellent color, being bright yellow with slightly green tips and have the same flavor and nutritional value as bananas ripened naturally. The ripening gas, whether mixed with air in the room or under pressure in the container, is non-flammable in any proportion with air and may be employed near electric equipment, cigarettes, or even open flames without danger of explosion.

Thus it is that the novel non-flammable compositions useful for ripening fruit in accordance with this invention comprise from about 57 mol percent to about 75 mol percent of a non-flammable volatile fluorinated hydrocarbon having less than five carbon atoms and from about 43 mol percent to about 25 mol percent of an olefinic hydrocarbon gas having less than five carbon atoms.

The non-flammable fluorine-carbon compounds may be employed with other flammable ripening gases besides those mentioned. Appropriate concentrations to provide non-explosive compositions are determinable by known methods.

Having thus described this invention, what is claimed is:

1. A method of ripening fruit which comprises placing said fruit in an enclosed space, introducing into said space as a mixed vapor phase stream from about 43 to about 25 mol percent of the olefinic hydrocarbon having less than 5 carbon atoms and from about 57 to about 75 mol percent of a non-flammable volatile halogen derivative of a hydrocarbon having less than 5 carbon atoms and at least one fluorine atom, and maintaining said fruit and said composition in said enclosed space until ripening is effected.

2. A method of ripening fruit which comprises placing said fruit in an enclosed space, preheating a mixed stream of from about 43 to about 25 mol percent of an olefinic hydrocarbon having less than 5 carbon atoms and from about 57 to about 75 mol percent of a volatile non-flammable halogen derivative of a hydrocarbon having less than 5 carbon atoms and at least one fluorine atom to place all components of said mixed stream in the vapor phase, introducing said vapor phase stream into said enclosed space, maintaining said fruit and said composition in said enclosed space until ripening is effected.

3. A method of ripening fruit which comprises placing said fruit in an enclosed space, introducing a mixed stream of a composition comprising from about 43 to about 25 mol percent of propylene and from about 57 to about 75 mol percent of monochlorodifluoromethane into said enclosed space and maintaining said fruit in said enclosed space until ripening is effected.

4. A method of ripening fruit which comprises placing said fruit in an enclosed space, introducing into said space a mixed stream of a composition comprising from about 43 to about 25 mol percent of an olefinic hydrocarbon having less than five carbon atoms and from about 57 to about 75 mol percent of octafluorocyclobutane.

5. A method of ripening fruit which comprises placing said fruit in an enclosed space, preheating a mixed stream of from about 43 to about 25 mol percent of an olefinic hydrocarbon having less than five carbon atoms and from about 57 to about 75 mol percent of octafluorocyclobutane to place all components in said mixed stream in a vapor phase, introducing said vapor phase stream into said enclosed space and maintaining said fruit and said composition in said enclosed space until ripening is effected.

6. A non-flammable composition for ripening fruit comprising from about 43 to about 25 mol percent of propylene and from about 57 to about 75 mol percent of monochlorodifluoromethane.

7. A non-flammable composition for ripening fruit which comprises from about 43 to about 25 mol percent propylene and from about 57 to about 75 mol percent dichlorodifluoromethane.

8. A non-flammable composition for ripening fruit, comprising from about 43 to about 25 mol percent of an olefinic hydrocarbon having less than five carbon atoms and from about 57 to about 75 mol percent of octafluorocyclobutane.

References Cited in the file of this patent

UNITED STATES PATENTS

| | | |
|---|---|---|
| 1,716,791 | Ness | June 11, 1929 |
| 2,577,421 | Keller | Dec. 4, 1951 |

OTHER REFERENCES

Goodhue et al.: "Dispersants for Aerosols" in "Soap and Sanitary Chemicals," vol. 21, No. 4, pp. 123 to 127.